United States Patent
Wang et al.

(10) Patent No.: US 8,910,169 B2
(45) Date of Patent: Dec. 9, 2014

(54) METHODS AND SYSTEMS TO PERFORM A COMPUTER TASK IN A REDUCED POWER CONSUMPTION STATE

(75) Inventors: Jing W. Wang, Shanghai (CN); Ming Kuang, Shanghai (CN); Michael A. Rothman, Puyallup, WA (US); Vincent J. Zimmer, Federal Way, WA (US); Jack Chen, Shanghai (CN); Yebin Andy Zhao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1158 days.

(21) Appl. No.: 12/241,849

(22) Filed: Sep. 30, 2008

(65) Prior Publication Data
US 2010/0083260 A1    Apr. 1, 2010

(51) Int. Cl.
*G06F 1/32*    (2006.01)

(52) U.S. Cl.
CPC .................................. *G06F 1/3203* (2013.01)
USPC ........................................................ 718/102

(58) Field of Classification Search
CPC ............................. G06F 1/3287; G06F 9/5077
USPC ........................................ 718/1, 102; 713/320
See application file for complete search history.

(56) References Cited

U.S. PATENT DOCUMENTS

| | | | |
|---|---|---|---|
| 7,383,374 B2 | 6/2008 | Yamada et al. | |
| 7,421,689 B2 | 9/2008 | Ross et al. | |
| 8,209,554 B2 * | 6/2012 | Parker et al. | 713/300 |
| 2004/0053643 A1 | 3/2004 | Kimura | |
| 2005/0166074 A1 | 7/2005 | Hack | |
| 2006/0085794 A1* | 4/2006 | Yokoyama | 718/100 |
| 2007/0288941 A1 | 12/2007 | Dunshea et al. | |
| 2007/0300189 A1 | 12/2007 | Zhao et al. | |
| 2008/0104587 A1* | 5/2008 | Magenheimer et al. | 718/1 |
| 2008/0109669 A1* | 5/2008 | Kim | 713/323 |
| 2008/0120499 A1 | 5/2008 | Zimmer et al. | |
| 2008/0163205 A1 | 7/2008 | Bennett et al. | |
| 2008/0201710 A1 | 8/2008 | Anderson et al. | |
| 2008/0216096 A1 | 9/2008 | Wang | |
| 2008/0307240 A1* | 12/2008 | Dahan et al. | 713/320 |

FOREIGN PATENT DOCUMENTS

| | | |
|---|---|---|
| CN | 1760836 A | 4/2006 |
| CN | 101211271 A | 7/2008 |
| CN | 101788845 A | 7/2010 |
| EP | 1959348 A2 | 8/2008 |

(Continued)

OTHER PUBLICATIONS

Office Action from corresponding application in Japan; application No. 2009-226717, mailed Jul. 5, 2011; 2 pages.

(Continued)

*Primary Examiner* — Robert Fennema
(74) *Attorney, Agent, or Firm* — Garrett IP, LLC

(57) ABSTRACT

Methods and systems to perform a computer task in a reduced power consumption state, including to virtualize physical resources with respect to an operating environment and service environment, to exit the operating environment and enter the service environment, to place a first set of one or more of the physical resources in a reduced power consumption state, and to perform a task in the service environment utilizing a processor and a second set of one or more of the physical resources. A physical resource may be assigned to an operating environment upon an initialization of the operating environment, and re-assigned to the service environment to be utilized by the service environment while other physical resources are placed in a reduced power consumption state.

27 Claims, 7 Drawing Sheets

(56) References Cited

FOREIGN PATENT DOCUMENTS

| | | | |
|---|---|---|---|
| JP | 08234872 | A | 9/1996 |
| JP | 2005209198 | A | 8/2005 |
| JP | 2006024207 | A | 1/2006 |
| JP | 2006-113767 | A | 4/2006 |
| JP | 2007-328782 | A | 12/2007 |
| JP | 2007328782 | A | 12/2007 |
| JP | 2008-146566 | A | 6/2008 |
| JP | 2008522322 | A | 6/2008 |
| KR | 10 2001 0073673 | A | 8/2001 |
| KR | 10-2004-0024479 | A | 3/2004 |
| KR | 10 2004 0059629 | A | 7/2004 |
| KR | 10 2008 0022408 | A | 3/2008 |
| WO | 2006060237 | A2 | 6/2006 |

OTHER PUBLICATIONS

Office Action from corresponding application in Japan; application No. 2009-226717, mailed Dec. 13, 2011; 4 pages.

Tanenbaum, Andrew S. "Structured Computer Organization", ISBN 0-13-852872-1 Third Edition. Prentice-Hall International Inc. 1990, 4 pages.

Office Action Received for Japanese Patent Application No. 2009-226717, mailed on Oct. 23, 2012, 2 page of Office Action and 3 page of English Translation.

Notice of Allowance Received for Korean Patent Application No. 2009-0093550, mailed on Oct. 28, 2011, 5 pages of Notice of Allowance and 1 page of English Translation.

Office Action Received for Chinese Patent application No. 200910246861.7, mailed on Oct. 19, 2011, 3 pages of Office Action and 2 pages of English Translation.

Office Action Received for European Patent Application No. 09252330.7, mailed on Feb. 24, 2010, 3 pages.

Office Action Received for European Patent Application No. 09252330.7, mailed on Feb. 15, 2012, 10 pages.

Office Action Received for Korean Patent Application No. 10-2009-0093550, mailed on Feb. 1, 2011, 5 pages of English Translation only.

Office Action Received for Chinese Patent application No. 200910246861.7, mailed on Jun. 15, 2012, 3 pages of Office Action and 2 pages Of English Translation.

Office Action received for Chinese Patent Application 200910246861.7, mailed on Sep. 4, 2013, 17 pages of Office Action including 10 pages of English translation.

Office Action received for Japanese Patent Application 2009-226717, mailed on Nov. 12, 2013, 24 pages of Office Action including 4 pages of English translation.

Office Action received for Japanese Patent Application 2012-091070, mailed on Oct. 1, 2013, 4 pages of Office Action including 2 pages of English translation.

Office Action Received for Chinese Patent application No. 00910246861.7, mailed on Jan. 15, 2013, 17 Pages of Office Action including 1 page of Search Report and 8 pages of English Translation.

Office Action received for Chinese Patent Application No. 200910246861.7, mailed on Apr. 19, 2013, 15 pages of Office Action Including 9 pages of English Translation.

* cited by examiner

METHODS AND SYSTEMS TO PERFORM A COMPUTER TASK IN A REDUCED POWER CONSUMPTION STATE

BACKGROUND

Computer systems include a plurality of physical resources that consume electrical power.

A computer system may include a system-wide power-save feature to place all or substantially all physical resources, including an instruction processor, in a reduced-power or sleep state.

During normal operation, a computer system may utilize one or more physical resources when performing a task, during which one or more other physical resources may not be utilized. For example, a data transfer between a storage device and a network may utilize the storage device and a network interface card, but may not utilize other physical resources, such as a display, a printer, a keyboard, and other physical resources.

Where a computer task may take a relatively long period of time to complete, such a as a relatively large data transfer, or where the task may be performed when the computer is not needed for other purposes, maintaining non-utilized physical resources in active states unnecessarily consumes power.

BRIEF DESCRIPTION OF THE DRAWINGS/FIGURES

Figure 1:
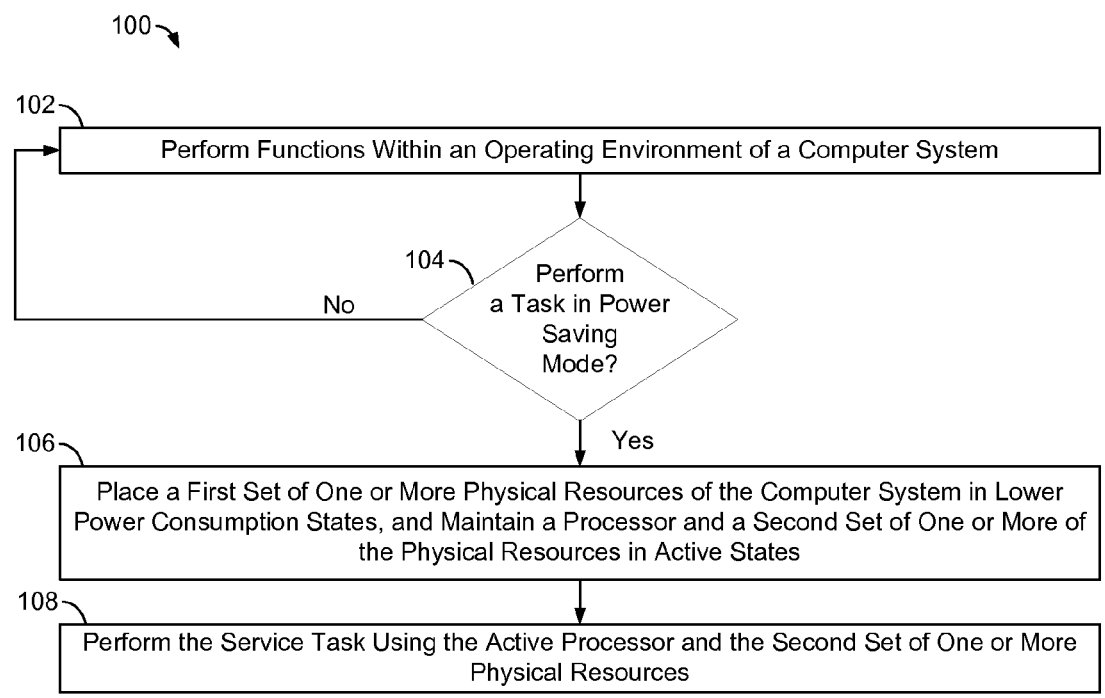
FIG. 1 is a process flowchart of an exemplary method of performing a task in a computer system with one or more physical resources of the computer system in a lower power consumption mode or state.

In the drawings, the leftmost digit(s) of a reference number identifies the drawing in which the reference number first appears.

DETAILED DESCRIPTION

FIG. 1 is a process flowchart of an exemplary method 100 of performing a task in a computer system with one or more physical resources of the computer system in a lower power consumption mode or state.

At 102, one or more tasks or functions are performed in an operating environment of a computer system. The one or more function may be performed in response to one or more applications running within the operating environment.

At 104, a determination may be made to perform a task in a power saving mode.

At 106, upon a determination to perform a task in a power saving mode, a first set of one or more physical resources of the computer system is placed in a lower power consumption mode or state, and a processor and a second set of one or more of the physical resources are maintained in an active mode or state.

Physical resources may include an input/output (I/O) device, which may include one or more of:
a human interface device (HID), such as a display or monitor, a printer, a keyboard, and a pointer device;
a storage device, such as a hard disk drive storage device, an optical storage device, and a removable storage device; and
a network interface card (NIC) device.

The lower power consumption state may include one or more of a reduced performance state and an inactive state. A lower performance state may include a reduced operating speed state. An inactive state may include one or more of an intermediate power state, such as a D1 or D2 state, and a power-off state, such as a D3 state, in which a corresponding device may be unresponsive to a communication bus.

The processor may be maintained at normal performance state or a lower performance state, such as a lower speed state.

Where the computer system includes multiple processors, or cores, at least one of the processors or cores is maintained in an active state. Remaining processors or cores may be placed in a lower power consumption state, which may include one or more of a lower performance state and an inactive state. An inactive state may include one or more of a halt state, such as a C1 state, a stop-clock state, such as a C2 state, and a sleep state, such as a C3 state, and a power-off state.

At 108, the task is performed using the active processor and the second set of one or more active physical resources.

The second set of one or more physical resources may include a network interface device and a storage device, and the task may include controlling the network interface device to transfer information between a network and the storage device. The task may include one or more of uploading information from the computer system to the network, which may be performed to back-up information from the computer system to the network, and downloading information from the network to the computer system. As used herein, information may include one or more of data and instructions.

The computer system may be configured to support multiple operating environments, and to perform the task from a service environment while other operating environments are essentially in a sleep state, examples of which are provided below.

Figure 2:
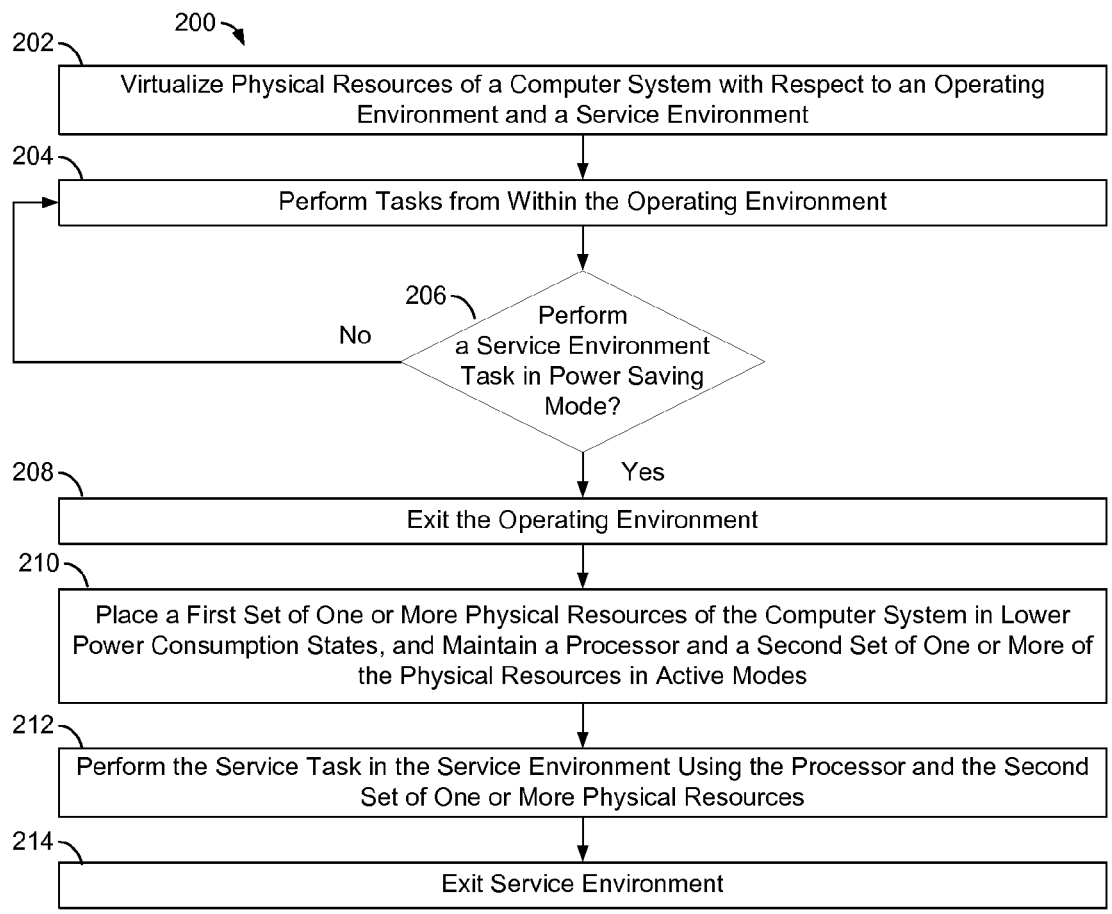
FIG. 2 is a process flowchart of an exemplary method of virtualizing physical resources of a computer system with respect to an operating environment and a service environment, and performing a service task in the service environment with one or more physical resources of the computer system in a lower power consumption state.

FIG. 2 is a process flowchart of an exemplary method 200 of virtualizing physical resources of a computer system with respect to an operating environment and a service environment, and performing a service task in the service environment with one or more physical resources of the computer system in a lower power consumption state.

At 202, physical resources of a computer system are virtualized with respect to one or more operating environments and a service environment. The one or more operating environments may include one or more conventional operating environments. The virtualization of physical resources may include initiating virtual machine management (VMM) logic on the computer system.

At 204, one or more tasks or functions are performed in the operating environment. The one or more function may be performed in response to one or more applications running within the operating environment.

At 206, a determination may be made to perform a service environment task or service task in a power saving mode or state. The determination may be made in response to one or more of a scheduled service task, request from the operating environment to place the computer system in a reduced power consumption mode when a service task is in progress or scheduled, and an instruction received over a network.

At 208, upon a determination to perform a service task in a power saving mode, the operating environment is exited and the service environment is entered.

The exiting of the operating environment may include or be similar to a virtual machine (VM) exit, and may include saving a state of the operating environment, including states of any application running in the operating environment and any associated open data files, to permit subsequent re-entry to the operating environment without re-booting. State information may be saved to one or more of volatile memory, such as random access memory (RAM), as in a sleep or S3 state, and non-volatile memory, such as a hard disk drive, as in a hibernate or S4 state.

The exiting of the operating environment may include exiting applications and closing associated data files, without saving state information, akin to a soft-off state, such as a G2 or S5 state, or a mechanical-off state, such as a G3 state.

At 210, a first set of one or more physical resources of the computer system is placed in a lower power consumption state, while a processor and a second set of one or more of the physical resources are maintained in an active state, substantially as described above with respect to 106 in FIG. 1.

At 212, the service task is performed in the service environment using the active processor and the second set of one or more active physical resources.

At 214, the service environment may be exited upon completion of the service task. Upon exiting the service environment, the second set of one or more physical resources may be placed in lower power consumption state. Alternatively, the operating environment may be re-entered or re-activated and the first set of one or more physical resourced may be returned to an active state.

A service environment may be configured to perform multiple service tasks, one or more of which may have a corresponding set of active physical resources. A computer system may be configured to support multiple service environments, each having one or more corresponding service environment tasks and corresponding active physical resources.

The placing of the first set of one or more physical resources in the reduced power consumption state may be performed selectively, as described below with respect to FIG. 3. For example, where the service task may be completed relatively quickly, the first set of one or more physical resources may be maintained in an active state and the operating environment may be re-entered upon completion of the service task. Where the service task may take a relatively long time, the first set of one or more physical resources may be placed in the reduced power consumption state as described above with respect to FIG. 2.

Figure 3:
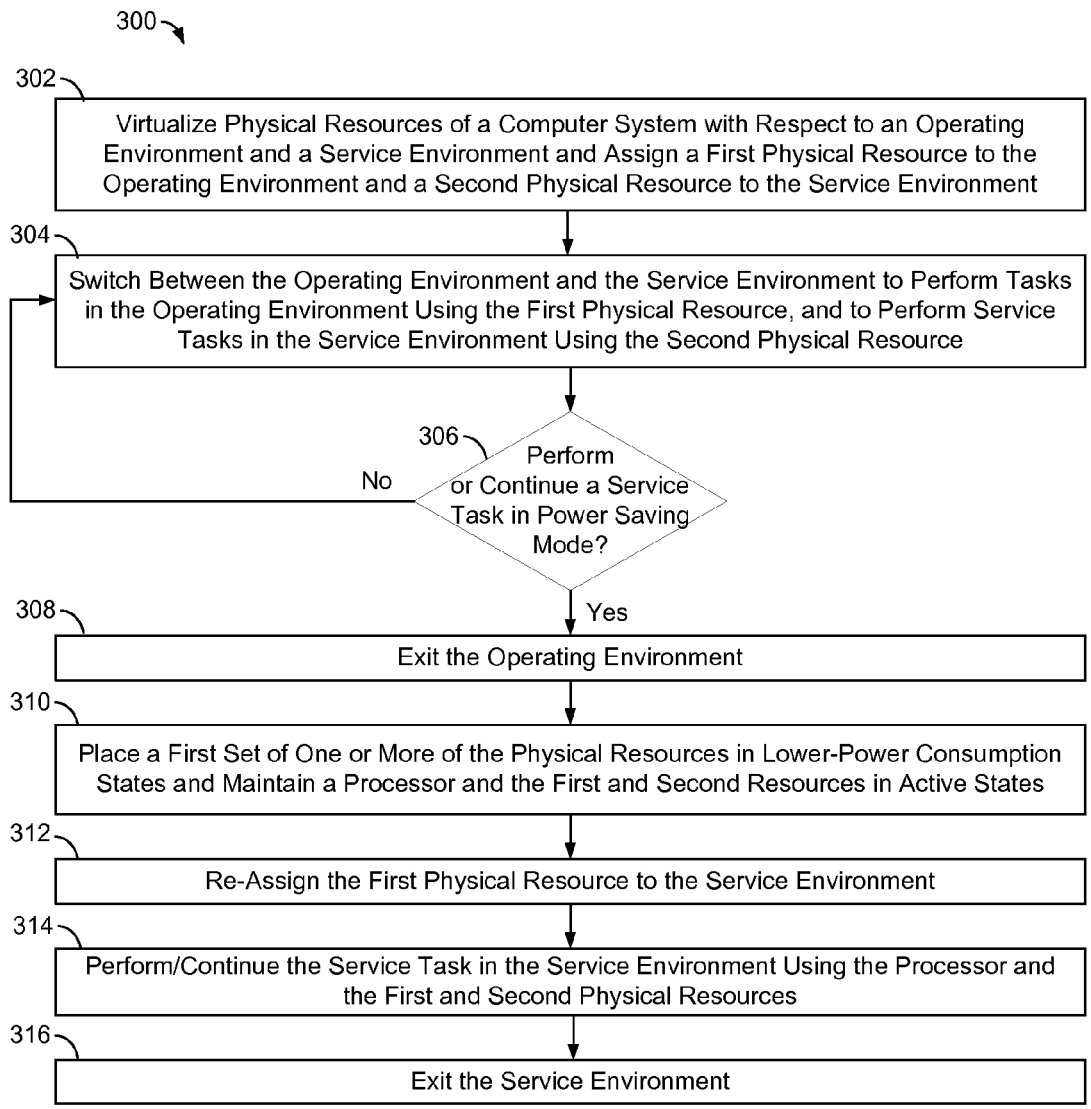
FIG. 3 is a process flowchart of an exemplary method of selectively placing a subset of physical resources of a computer system in a lower power consumption state when performing a service environment task.

FIG. 3 is a process flowchart of an exemplary method 300 of selectively placing a set of one or more physical resources of the computer system in a lower power consumption state when performing a service environment task.

At 302, physical resources of a computer system are virtualized with respect to one or more operating environments and a service environment, including assigning a first physical resource to the operating environment and assigning a second physical resource to the service environment.

At 304, operation of the computer system switches between the operating environment and the service environment to perform tasks using the corresponding assigned physical resources.

For example, the first physical resource may include a storage device, such as a hard disk drive, and the second physical resource may include a network interface device, referred to herein as a network interface card (NIC). The service task may include controlling the NIC and the storage device to transfer data between the storage device and a network. Switching between the operating environment and the service environment at 304 may include entering the service environment to communicate between the computer system and a network, and entering the operating environment to access the storage device. The switching at 304 may include corresponding virtual machine (VM) exits and VM entries. Where a service task is to be completed relatively quickly, physical resources of the computer system may be maintained in active states during the service task.

At 306, a determination may be made to perform, or continue performing a service task in a power saving mode, substantially as described above with respect to 206 in FIG. 2.

At 308, upon a determination to perform a service task in a power saving mode, the operating environment is exited, substantially as described above with respect to 208 in FIG. 2.

At 310, a first set of one or more physical resources of the computer system is placed in a lower power consumption state, and a processor and a second set of the physical resources are maintained in an active state, substantially as described above with respect to 210 in FIG. 2.

In the example of FIG. 3, the second set of the physical resources includes the first and second physical resources initially assigned to the operating environment and the service environment, respectively.

At 312, the first physical resource is re-assigned to the service environment, to allow the first physical resource to be controlled from the service environment. The re-assigning may include providing direct access to a driver associated with the first physical resource, or re-initiating the driver within or with respect to the service environment. Assigning of the first physical resource to the service environment may include updating a system management controller, and may include updating an interrupt processing feature of a system management controller, or SMC IRP.

At 314, the service task is performed in the service environment using the active processor and the second set of one or more active physical resources, including the first and second physical resources.

At 316, upon completion of the service task, service environment may be exited. Upon exiting the service environment, the processor and the second set of physical resources may be placed in lower power consumption states, which may be akin to placing the computer system in a system-wide sleep mode. Alternatively, the operating environment may be re-entered, the first set of physical resources may be placed in active states, and the first physical resource may be re-assigned to the operating environment.

A determination may be made between effecting system-wide sleep mode and re-entering the operating environment. Such a decision may be made in response to input received from the operating environment at 306.

One or more features described herein with respect to methods 100, 200, and 300 may be implemented alone and in various combinations with one another.

One or more of methods 100, 200, and 300, and portions thereof, may be implemented in logic, which may include one or more of integrated circuit logic and computer program product logic.

Figure 4:
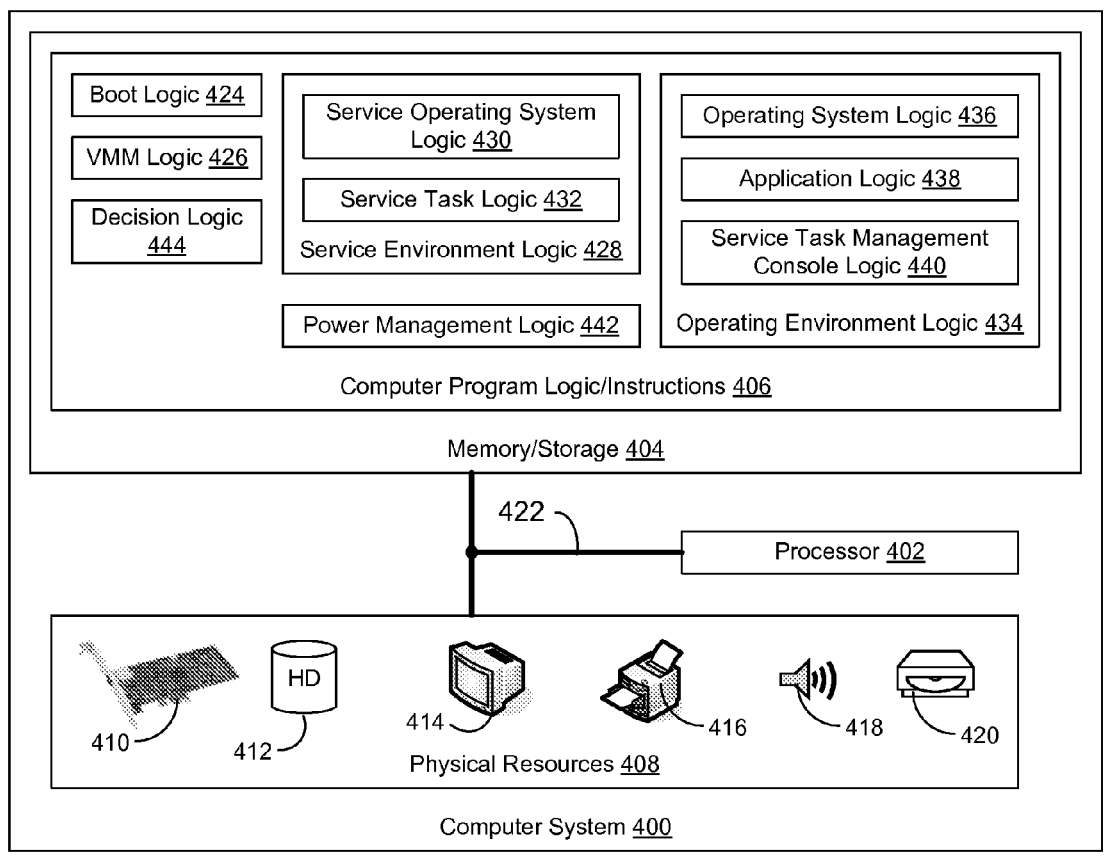
FIG. 4 is a block diagram of an exemplary computer system 400.

FIG. 4 is a block diagram of an exemplary computer system 400, including one or more computer instruction processing units or cores, illustrated here as a processor 402, to execute computer program product logic, also known as instructions, code, and software.

Computer system 400 includes memory/storage 404, including a computer readable medium having computer program product logic or instructions 406 stored thereon, to cause processor 402 to perform one or more functions in response thereto.

Computer system 400 includes physical resources 408, which may include one or more of a network interface device or card (NIC) 410, a hard disk storage device (HD) 412, a display or monitor 414, a printer device 416, an audio speaker 418, and a removable storage device 420.

Computer system 400 includes a communications infrastructure 422 to communicate data and instructions amongst processor 402, memory/storage 404, and physical resources 408. Communications infrastructure 422 may include a universal serial bus (USB) interface to one or more of physical resources 408.

In the example of FIG. 4, logic 406 includes boot logic 424, to cause processor 402 to initialize computer system 400 upon a system reset. Boot logic 424 may include driver logic corresponding to one or more of physical resources 408 to cause processor 402 to initialize corresponding physical resources 408 following a system reset. Boot logic 424 may include extensible firmware interface (EFI) logic.

Logic 406 further includes virtual machine management (VMM) logic 426 to cause processor 402 to virtualize one or more of physical resources 408 to one or more operating environments.

Logic 406 further includes service environment logic 428, including service operating system (SOS) logic 430 to cause processor 402 to host a service environment, and service task logic 432 to cause processor 402 perform one or more service tasks within the service environment.

Logic 406 further includes operating environment logic 434, including operating system logic 436 to cause processor 402 to host an operating environment. Operating environment logic 434 may include application logic 438 corresponding to one or more application programs to cause processor 402 to perform one or more tasks within the operating environment. Operating environment logic 434 may include service task management console logic 440 to cause processor 402 to initiate and/or schedule a service task to be performed in the service environment. Service task management console logic 440 may include logic to cause processor 402 to display a console or window and to receive user-input.

Logic 406 further includes power management logic 442 to cause processor 402 to place one or more of physical resources 408 in a reduced power consumption state.

Logic 406 may include decision logic 444 to invoke service task logic 432 and power management logic 442, substantially as described above with respect to FIG. 3.

Exemplary operation of computer system 400 is described below with respect to FIGS. 5-8. Computer system 400 is not, however, limited to the examples below.

Figure 5:
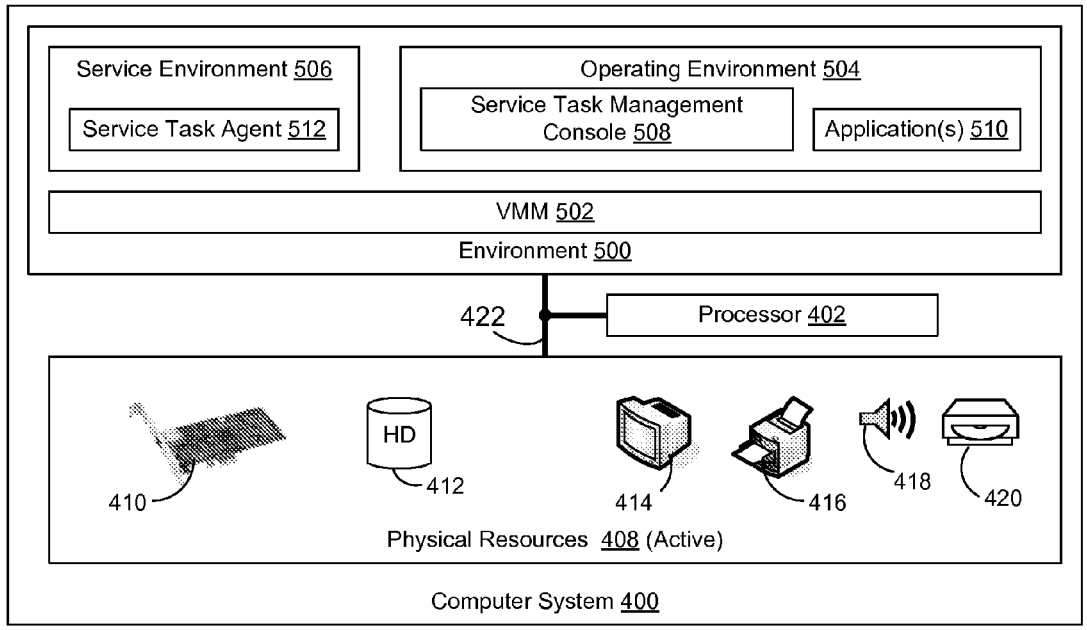
FIG. 5 is a graphical depiction of an exemplary environment of computer system 400.

FIG. 5 is a graphical depiction of an exemplary environment 500 of computer system 400, including a VMM layer 502 corresponding to VMM logic 426 in FIG. 4, to host an operating environment 504 corresponding to operating system logic 436 in FIG. 4, and a service environment 506 corresponding to SOS logic 430 in FIG. 4.

Service environment 506 may include one or more service task agents 512 corresponding to service task logic 432 to perform one or more service tasks in service environment 506.

Operating environment 504 may include a service task management console 508 corresponding to service task management console logic 440 in FIG. 4, which may include a display window to present selectable features corresponding to service task agent 512.

Operating environment 504 may include one or more applications 510 corresponding to application logic 438 in FIG. 4.

In the example of FIG. 5, physical resources 408 are illustrated in active states, and thus may be accessible to one or more of operating environment 502 and service environment 504.

Figure 6:
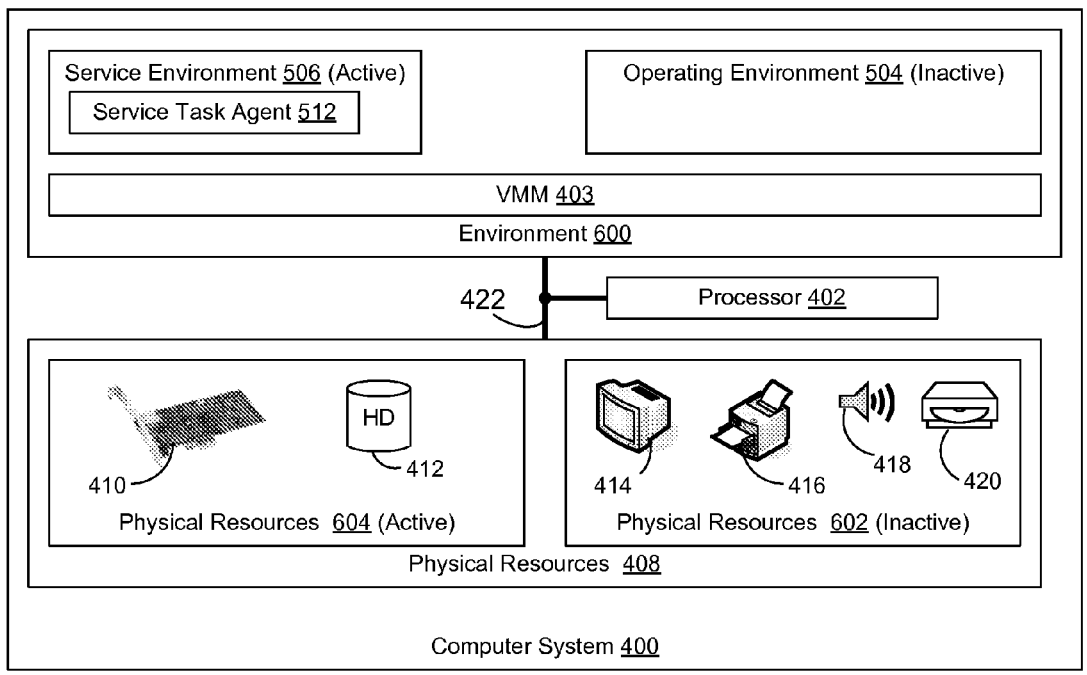
FIG. 6 is a graphical depiction of another exemplary environment of computer system 400.

FIG. 6 is a graphical depiction of an exemplary environment 600 of computer system 400, wherein operating environment 504 is illustrated as inactive and service environment 506 is illustrated as active. Additionally, a first set 602 of physical resources 408 is illustrated as inactive and a second set 604 of physical resources 408 is illustrated as active.

In the example of FIG. 6, the active second set 604 of physical resources 408 include NIC 410 and HD 412. Service task agent 512 may be configured to control NIC 410 and HD 412 to download data and/or instructions from a network to HD 412, and/or to upload data and/or instructions from HD 412 to the network.

As described above with respect to FIG. 3, one or more of physical resources 408 may be assigned to operating environment 504. Similarly, one or more other physical resources of physical resources 408 may be assigned to service environment 506.

Figure 7:
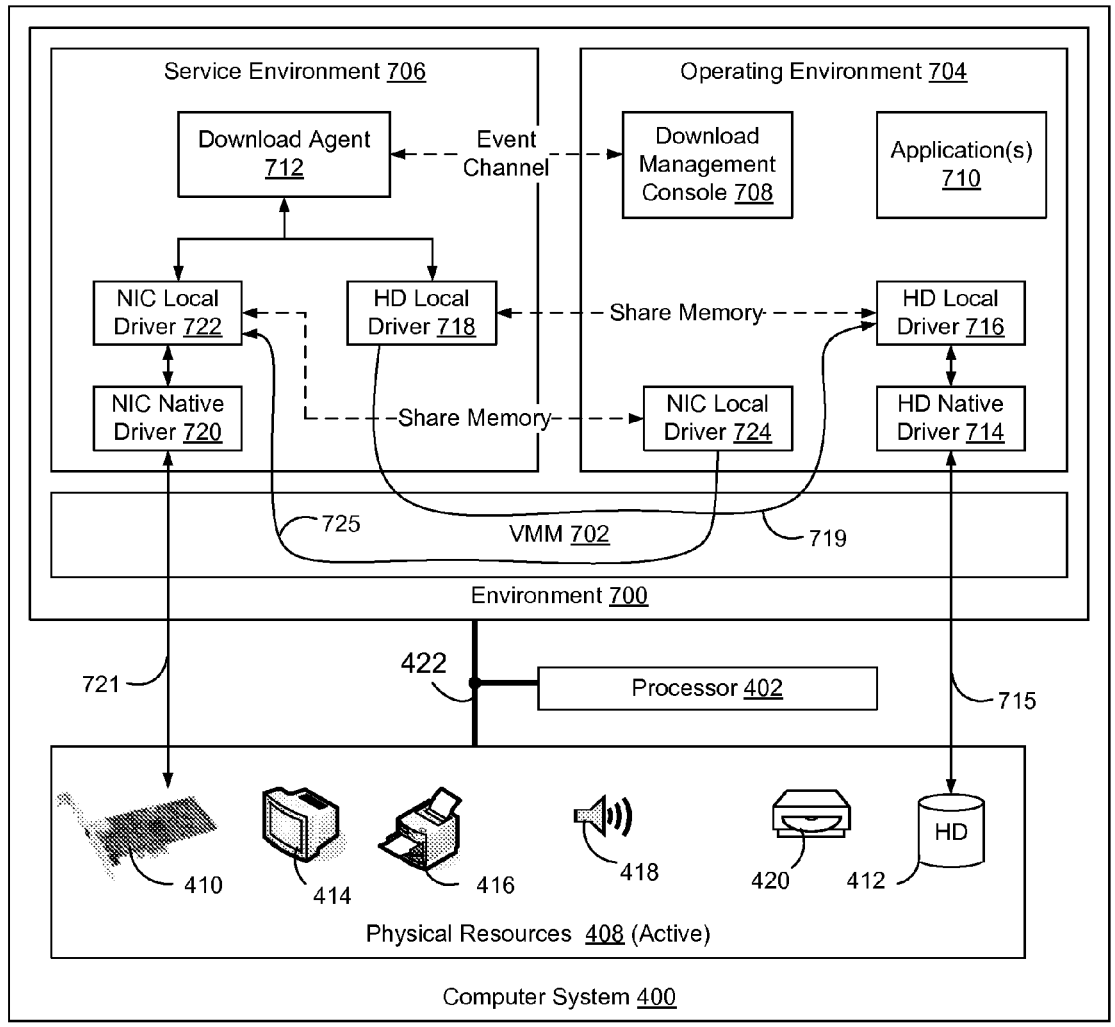
FIG. 7 is a graphical depiction of another exemplary environment of computer system 400.

FIG. 7 a graphical depiction of an exemplary environment 700 of computer system 400, wherein NIC 410 is assigned to a service environment and HD 412 is assigned to an operating environment.

Environment 700 includes a VMM layer 702 corresponding to VMM logic 426 in FIG. 4, to host an operating environment 704 corresponding to operating system logic 436 in FIG. 4, and a service environment 706 corresponding to SOS logic 430 in FIG. 4.

Service environment 706 includes a download agent 712, corresponding to service task logic 432, to control data transfers between NIC 410 and HD 412 when a first set of physical resources is placed in a reduced power consumption state.

Operating environment 704 may include a download management console 708 corresponding to service task management console logic 440 in FIG. 4, which may include a console or display window to present selectable features corresponding to download agent 712.

Operating environment 704 may include one or more applications 710 corresponding to application logic 438 in FIG. 4.

Operating environment 704 may include a HD native driver 714 to access HD 412, as illustrated at 715. Operating environment 704 may further include a HD local driver 716 to process HD access requests 719 from service environment 706. Service environment 706 may include a HD local driver 718 to send HD access requests 719.

Similarly, service environment 706 may include a NIC native driver 720 to access NIC 410, as illustrated at 721. Service environment 706 may further include a NIC local driver 722 to process NIC access requests 725 from operating environment 704. Operating environment 704 may include a NIC local driver 724 to send NIC access requests 725.

One or more of drivers 714, 716, 718, 720, 722, and 724 may be initialized during a boot procedure of computer system 400.

During normal VMM operation, when operating environment 704 sends a NIC access request 725, processor 402 may exit operating environment 704 and enter service environment 706, to process NIC access request 725 through NIC local driver 722 and NIC native driver 720. This may be performed without invoking power management logic 442, and may be performed without invoking download agent 712.

Where the processing of NIC access request 725 requires access to HD 412, service environment 706 may send a HD access request 719. In response, processor 402 may exit service environment 706 and enter service environment 704, to process HD access request 719 through HD local driver 716 and HD native driver 714. Processor 402 may thereafter switch between operating environment 704 and service environment 706 one or more additional times to process NIC access request 725.

When a network access is to be performed in a reduced power consumption mode, processor 402 may invoke service task logic 432 and power management logic 442, as described below with respect to FIG. 8.

Figure 8:
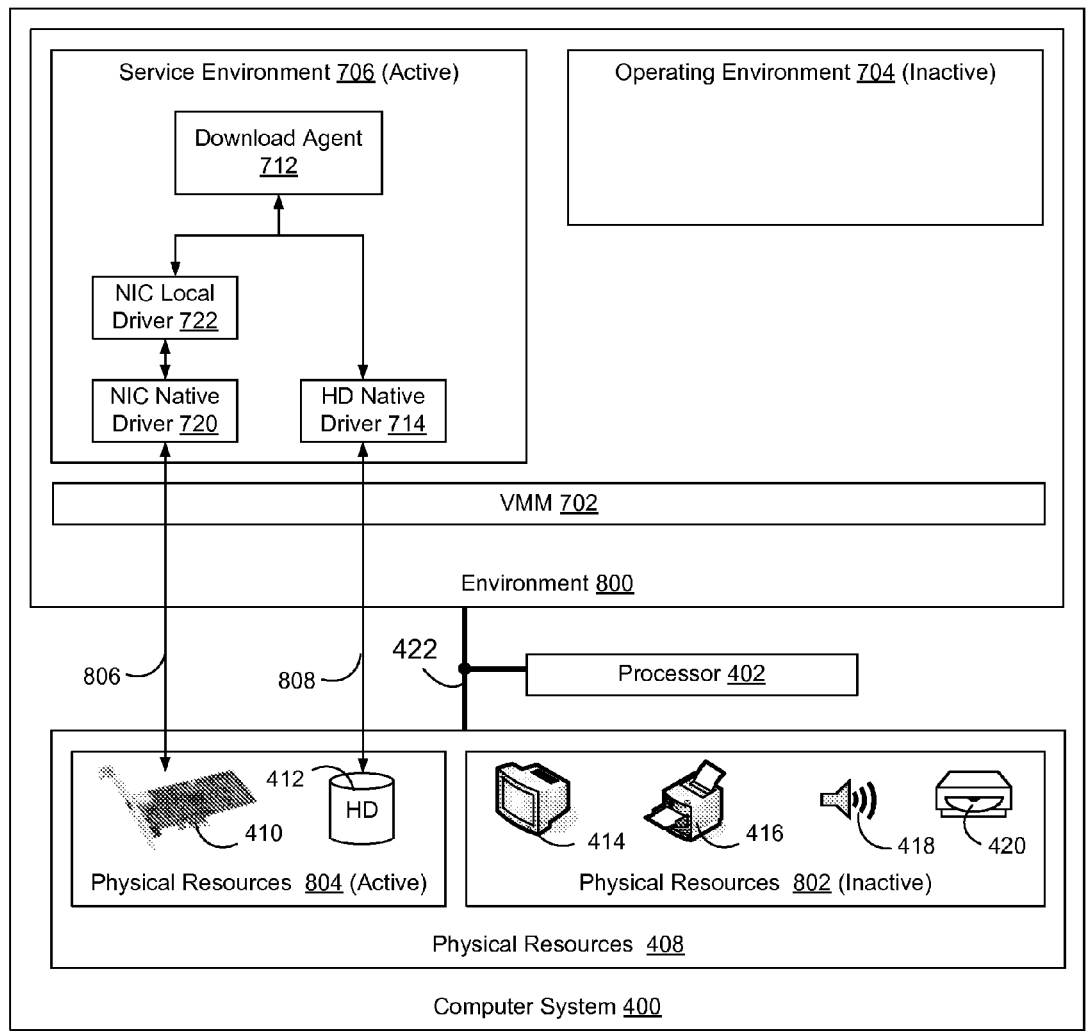
FIG. 8 is a graphical depiction of another exemplary environment of computer system 400.

FIG. 8 is a graphical depiction of an exemplary environment 800 of computer system 400, wherein operating environment 704 is illustrated as inactive and service environment 706 is illustrated as active. Additionally, a first set 802 of physical resources 408, including physical resources 414, 416, 418, and 420, is illustrated as inactive, and a second set 804 of physical resources 408, including NIC 410 and HD 412, is illustrated as active.

In addition, HD native driver 714 is illustrated associated with or assigned to service environment 706, to permit service environment 706 to access HD 412 without exiting service environment 706. Service environment 706 may thus access NIC 410, as illustrated at 806, and HD 412, as illustrated at 808.

Download agent 712 may be configured to control NIC 410 to transfer data between HD 412 and a network, which may include one or more of uploading data from HD 412 to the network, and downloading data from the network to HD 412.

Download management console 708 may be configured to provide instructions and/or data to download agent 712 prior to an exit from operating environment 704. Download management console 708 may be configured to receive instructions and/or data from one or more of a user and the network during normal operation.

Download agent 712 and power management logic 442 may be invoked following a request from operating environment 704 to place computer system 400 in a sleep state or a power-off state. Upon such a request, a determination may be made to perform or continue an existing network interface operation, such as a download or upload operation, in a reduced power consumption mode. In such a situation, operating environment 704 may be exited in accordance with a sleep mode or power off mode.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed. One skilled in the art will recognize that these functional building blocks can be implemented by discrete components, application specific integrated circuits, processors executing appropriate software, and combinations thereof.

What is claimed is:

1. A computer-implemented method, comprising:
    virtualizing physical resources of a computer system with respect to an operating environment and a service environment of the computer system;
    assigning a first one of the physical resources to the operating environment and a second one of the physical resources to the service environment;
    switching between the operating environment and the service environment to access the first physical resource in the operating environment and to access the second physical resource in the service environment;
    determining to perform a service task in a power saving mode of the computer system and, based on the determination, re-assigning the first physical resource from the operating environment to the service environment, placing a first set of physical resources in a reduced power consumption state, and performing the service task in the service environment with a second set of physical resources while the first set of physical resources is in the reduced power consumption state, wherein the second set of physical resources includes the first and second physical resources and at least a portion of a processor environment.

2. The method of claim 1, wherein the determining is based on a schedule of the service task.

3. The method of claim 1, wherein the determining is based on a request from the operating environment to place the computer system in a reduced power consumption state when the service task is in progress.

4. The method of claim 1, wherein the determining is based on a request from the operating environment to place the computer system in a reduced power consumption state when the service task is scheduled.

5. The method of claim 1, wherein the determining is based on an instruction received over a network.

6. The method of claim 1, wherein the re-assigning includes providing the service environment with direct access to a driver of the first physical resource.

7. The method of claim 1, wherein the re-assigning includes re-initiating a driver of with the first physical resource with respect to the service environment.

8. The method of claim 1, wherein the first physical resource includes a storage device and the second physical resource includes a network interface device, and wherein the performing a service task includes transferring information between the network interface device and the storage device.

9. The method of claim 1, wherein the determining is performed by an application program within the operating environment.

10. A computer system, comprising:
    a virtual machine manager (VMM) to,
        host an operating system within a first virtual machine (VM) and a service operating system within a second VM,
        virtualize physical resources of the computer system with respect to the operating system and the service operating system,
        assign a first one of the physical resources to the operating system and a second one of the physical resources to the service operating system, and
        switch between the operating system and the service operating system to access the first physical resource through the operating system and the second physical resource through the service operating system;

a power management system to place a first set of the physical resources in a reduced power consumption state; and a decision system to determine to perform a service task in a power saving mode of the computer system;

wherein the VMM is implemented to re-assign the first physical resource from the operating environment to the service environment, invoke the power management system to place a first set of physical resources in a reduced power consumption state, and enter the service environment to perform the service task in the service environment while the first set of the physical resources is in the reduced power consumption state, based on the determination; and wherein the second set of physical resources includes the first and second physical resources and at least a portion of a processor.

11. The system of claim 10, wherein the decision system is implemented to base the determination on a schedule of the service task.

12. The system of claim 10, wherein the decision system is implemented to base the determination on a request from the operating system to place the computer system in a reduced power consumption state when the service task is in progress.

13. The system of claim 10, wherein the decision system is implemented to base the determination on a request from the operating system to place the computer system in a reduced power consumption state when the service task is scheduled.

14. The system of claim 10, wherein the decision system is implemented to base the determination on an instruction received over a network.

15. The system of claim 10, wherein the VMM is implemented to provide the service operating system with direct access to a driver of the first physical resource when the first physical resource is re-assigned to the service operating system.

16. The system of claim 10, wherein the VMM is implemented to re-initiate a driver of with the first physical resource with respect to the service operating system when the first physical resource is re-assigned to the service operating system.

17. The system of claim 10, wherein the first physical resource includes a storage device and the second physical resource includes a network interface device, and wherein the service task includes transferring information between the network interface device and the storage device.

18. The system of claim 10, wherein the decision system includes an application program to execute under control of the operating system and to determine to perform the service task in the power saving mode of the computer system.

19. A non-transitory computer readable medium encoded with a computer program, including instructions to cause a processor to:

virtualize physical resources of a computer system with respect to an operating environment and a service environment of the computer system;

assign a first one of the physical resources to the operating environment and a second one of the physical resources to the service environment;

switch between the operating environment and the service environment to access the first physical resource from the operating environment and to access the second physical resource in the service environment;

determine to perform a service task in a power saving mode of the computer system and, based on the determination, re-assign the first physical resource from the operating environment to the service environment, place a first set of physical resources in a reduced power consumption state, and perform the service task in the service environment with a second set of physical resources while the first set of physical resources is in the reduced power consumption state, wherein the second set of physical resources includes the first and second physical resources and at least a portion of a processor.

20. The non-transitory computer readable medium of claim 19, wherein the determination is based on a schedule of the service task.

21. The non-transitory computer readable medium of claim 19, wherein the determination is based on a request from the operating environment to place the computer system in a reduced power consumption state when the service task is in progress.

22. The non-transitory computer readable medium of claim 19, wherein the determination is based on a request from the operating environment to place the computer system in a reduced power consumption state when the service task is scheduled.

23. The non-transitory computer readable medium of claim 19, wherein the determination is based on an instruction received over a network.

24. The non-transitory computer readable medium of claim 19, further including instructions to cause the processor to provide the service environment with direct access to a driver of the first physical resource when the first physical resource is re-assigned to the service environment.

25. The non-transitory computer readable medium of claim 19, further including instructions to cause the processor to re-initiate a driver of with the first physical resource with respect to the service environment when the first physical resource is re-assigned to the service environment.

26. The non-transitory computer readable medium of claim 19, wherein the first physical resource includes a storage device and the second physical resource includes a network interface device, and wherein the instructions further include instructions to cause the processor to transfer information between the network interface device and the storage device as part of the service task.

27. The non-transitory computer readable medium of claim 19, further encoded with an application program, including instructions to cause the processor to determine to perform the service task in the power saving mode of the computer system, from within the operating environment.

* * * * *